United States Patent [19]

Martineau

[11] Patent Number: 5,687,398
[45] Date of Patent: Nov. 11, 1997

[54] DEVICE HAVING AUTOMATIC PROCESS FOR UPGRADING THE PERFORMANCE OF MOBILE SYSTEMS

[75] Inventor: Philippe Martineau, Rockville, Md.

[73] Assignee: Gemplus Card International, Gemenos Cedex, France

[21] Appl. No.: 546,274

[22] Filed: Oct. 20, 1995

Related U.S. Application Data

[63] Continuation of Ser. No. 233,626, Apr. 26, 1994, abandoned.

[30] Foreign Application Priority Data

Apr. 28, 1993 [FR] France ................... 93 05023

[51] Int. Cl.⁶ .................................................. G06F 9/00
[52] U.S. Cl. ...................... 395/899; 395/561; 235/441
[58] Field of Search ........................... 235/382, 380, 235/441; 395/375, 275, 400, 899, 561

[56] References Cited

U.S. PATENT DOCUMENTS

| | | | |
|---|---|---|---|
| 4,697,073 | 9/1987 | Hara | 235/487 |
| 5,062,075 | 10/1991 | Yoshida et al. | 364/969.3 |
| 5,148,481 | 9/1992 | Abraham et al. | 380/46 |
| 5,161,256 | 11/1992 | Iijima | 902/26 |
| 5,200,600 | 4/1993 | Shinagawa | 235/492 |
| 5,204,663 | 4/1993 | Lee | 340/825.34 |

OTHER PUBLICATIONS

The very smart card by Shogase, 1988 IEEE publication, pp. 35–39 1988.

New architectures for smart cards by Caron et al., 1994 IEEE publication, pp. 148–155 1994.

Personal telephone services using IC–cards by Matsuo, 1989 IEEE publication, pp. 41–48.

*Primary Examiner*—Parshotam S. Lall
*Assistant Examiner*—Zarni Maung
*Attorney, Agent, or Firm*—Nilles & Nilles SC

[57] ABSTRACT

To simplify the manufacture of terminals for the use of chip cards, the system is designed so as to place a minimum set of instructions in these terminals and to transfer the storage of complementary instructions pertaining to uses of greater complexity and/or pertaining to the chip card into the chip card. To bring about the performance of these complementary instructions, an address designating an instruction of a complementary set is stored in a reserved memory of the chip card. The microprocessor of the chip card is furthermore provided with a microprogram enforcing the performance of an instruction thus designated as soon as it is detected that the reserved memory has been designated by an instruction of an elementary set of instructions of this microprocessor. It is shown that it is possible, in this way, to simplify and rationalize the manufacture of very powerful terminals.

10 Claims, 2 Drawing Sheets

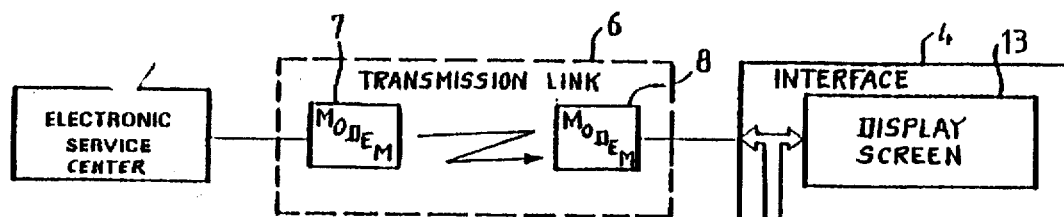
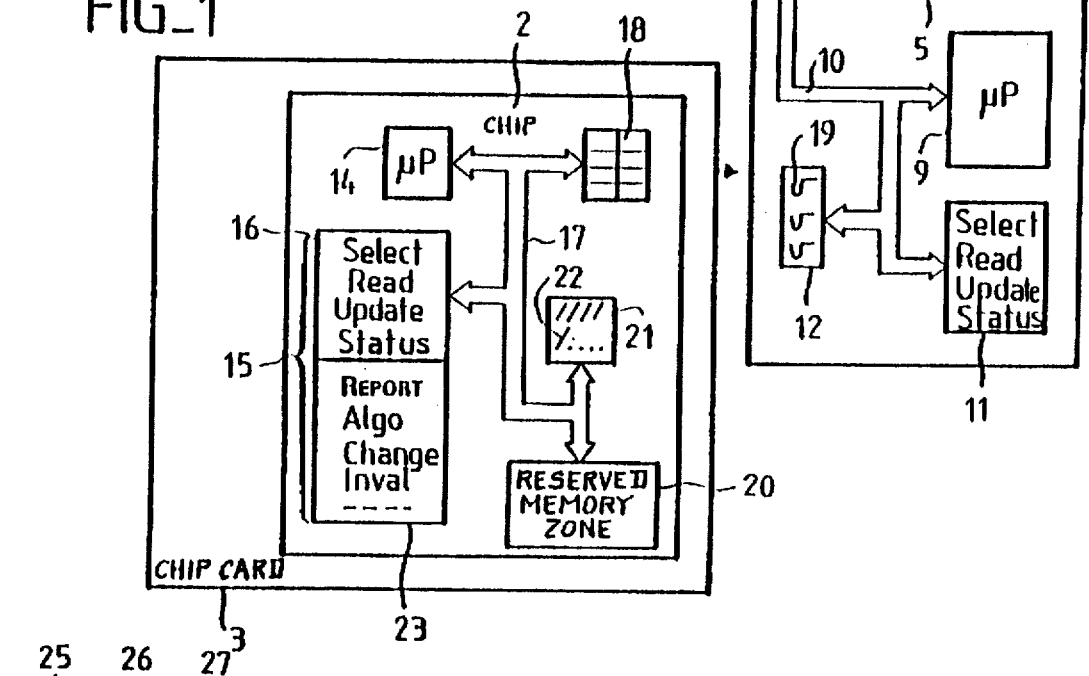
FIG_1
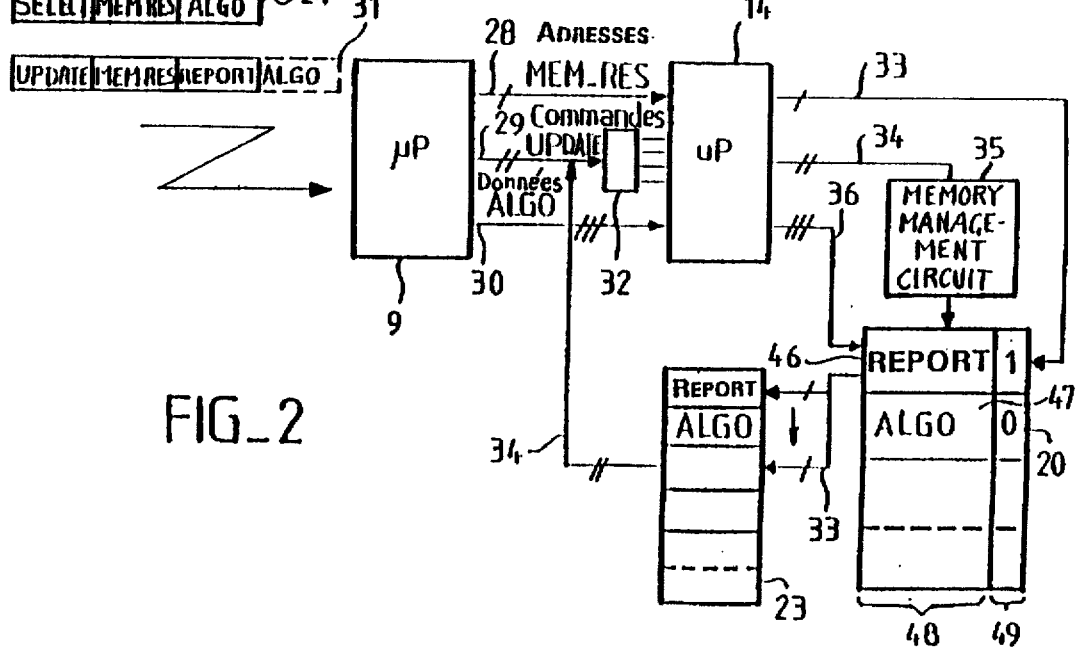
FIG_2

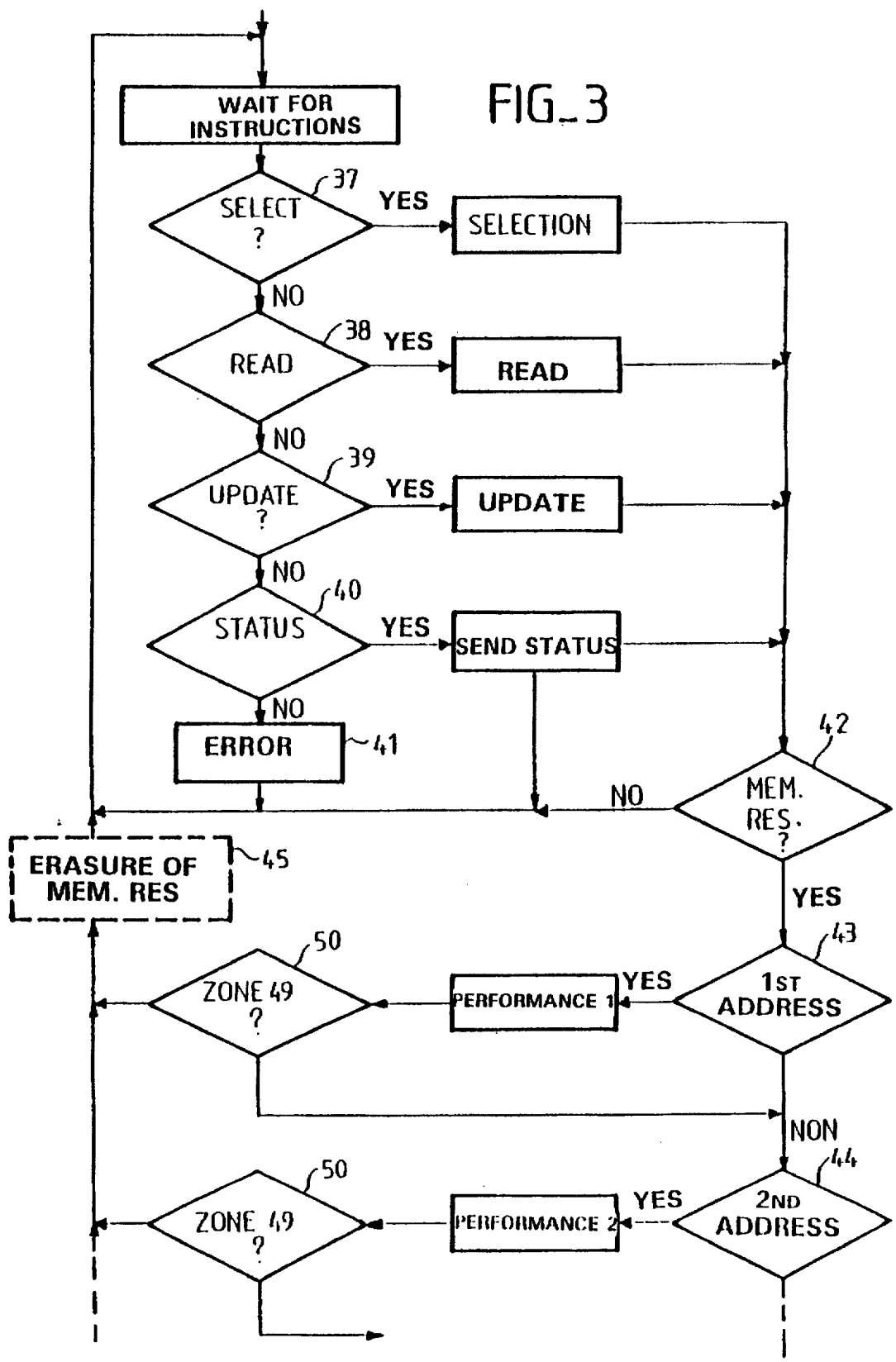
FIG_3

DEVICE HAVING AUTOMATIC PROCESS FOR UPGRADING THE PERFORMANCE OF MOBILE SYSTEMS

CROSS-REFERENCE TO RELATED APPLICATION

This is a continuation application of U.S. Ser. No. 08/233,626, filed Apr. 26, 1994 now abandoned.

BACKGROUND OF THE INVENTION

1. Field of the Invention

An object of the present invention is a system of communications between an electronic service center and a user by means of an interface. It is designed particularly for fields in which access to the interface is conditioned on the presence of an electronic microcircuit of the token, chip carrier, chip card or other type, that is temporarily and detachably or permanently inserted into the interface. This type of system is found for example with portable telephones that are kept available to users but must be barred to persons who have not inserted a corresponding circuit. It also pertains to all payment terminals making direct use of chip cards notably in order to bring about cash withdrawals from bank accounts.

2. Description of the Prior Art

The problem encountered with systems of this type is related to the definition of the interface. Indeed, at a given instant, the known requirements of safety and comfort of the transaction entail the implementation of procedures using the interface. These procedure are open-ended and constantly developing. The consequence or drawback thereof is that obsolete interfaces need to be changed as and when the system develops.

It is possible, nevertheless, to envisage the updating of the interface operation systems in a manner similar to that used to update operating systems in microcomputers. However, the drawback of this method is that several updating operations have to be carried out. Furthermore, the owner, or manager, of an interface is not its user, i.e. the person who possesses the authorizing electronic circuit in question. For example, for a terminal enabling payment by chip cards in a restaurant, the owner of the interface is the restaurant-owner while the user or payer is the bearer of the chip card. This is also the case with portable telephone systems, notably in the field of rented cars in which the portable telephone (and hence the interface) belong to a car rental firm (or to a telecommunications network utility company) and where the chip card or electronic circuit concerned belongs to the user. In this case, a difference in updating, from one interface to another, may make the use very complicated for a user.

There is a necessary gap between the wishes of the user whose interest lies in obtaining access, with his card, to the very latest improvements and the concerns of the interface manager who may be tempted, for reasons of cost, to limit the number of campaigns for updating the interfaces that he is managing.

A practical example of a need is the one felt in the field of portable telephones where the interface manager or else the owner of the electronic service center would like to be able to count down prepaid units in users' chip cards, somewhat as is done for public telephones. Now, in present-day portable telephone sets, the interfaces are not provided, in their operating system, with a set of instructions that enables this countdown or reverse counting operation. This will be the case at a later date. The problem to be resolved in this particular case, therefore, is that of carrying out a countdown in the chip card, with an interface that is not provided with means for this purpose, of the countdown pulses that would be sent by a telephone electronic service center. The difficulty of the problem can clearly be seen.

An object of the invention is to find a solution to this problem and to propose far greater flexibility of use of the interfaces or operating terminals. Several approaches may be envisaged. It is possible, notably, to define a "universal" mechanism that enables the terminals to be managed transparently from the electronic service center. For this purpose, it would be necessary to equip every existing terminal with this new mechanism. This approach is therefore an unrealistic one. The approach envisaged in the invention does not call for any modification of the terminal, and only uses resources of this terminal that are already available. These resources are either procedures available from the electronic service center or card instructions (these cards being fitted into the terminal) controlled from the electronic service center that enable data elements to be conveyed through the terminal up to the card. Furthermore, according to the invention, these terminals will themselves have the simplest possible operating system which, ultimately, will not even need to be constantly updated.

The idea of the invention entails the use, in the operating system of the interfaces, of a minimum set of instructions or even an existing procedure from the existing set of instructions. This set or this procedure is used to cause the designating, in a reserved zone of the memory of the chip, of an instruction of a complementary set, or extended set. This complementary instruction is then carried out either by the microprocessor of the chip card or by the microprocessor of the interface, these microprocessors acting on the designated peripherals. They prompt, for example, a display of information elements on a screen of the interface, a counting down of prepaid units in a memory of the chip card, a dispatching, to the electronic service center, of a report relating to the chip card and/or to the call in progress (notably for purposes of billing related to transmission times) or an invalidation of the chip card, etc.

With the existence of a reserved zone whose place and use are known, it is thus possible, with the minimum set of instructions of the interface operating system, to load the characteristics of an instruction. The characteristics of this instruction are either the instruction code of this instruction itself or an address of this instruction in a memory of the chip. In addition to this reserved zone, the microprocessor of the chip card contains an automatic process for carrying out the instruction whose characteristics have been loaded into the reserved zone. As soon as it is sought to increase the utilization capacity of a system, the characteristics of the instruction to be carried out are sent to the chip from the electronic service center. They are transmitted naturally by the interface. Since this interface is capable in practice of selecting and writing (this is a minimum) in a memory zone in the memory of the chip card, it can write the characteristics of this instruction therein. Subsequently, the microprocessor of the chip card takes over the operation in order to bring about the performance of this instruction with its automatic process.

In one improvement, rather than sending the instruction from the electronic service center, additional instructions will be loaded into updated chip cards, in additional sets of instructions. In this case, the characteristics of instructions to be sent by the electronic service center consist only of a designator, designating that one of the instructions which is to be carried out.

As a variant, an existing procedure is used to manage the card that is associated with the sending of a data element. A data element is given a particular form and, at reception in the card, it is ascertained that the data element has this particular form. If desired, an instruction of the extended set of instructions is carried out, and this instruction then corresponds to this particular data element.

SUMMARY OF THE INVENTION

An object of the invention, therefore, is a communications system comprising:

an electronic service center, an electronic chip borne by a chip card and a communications interface between this electronic service center, this chip and possibly a user;

in the interface, a microprocessor and a program memory provided with a limited set of instructions or procedures of communication with the chip, and in the chip, a microprocessor and a program memory also provided with a corresponding limited set of instructions or procedures, wherein the chip comprises a reserved memory zone in which, during a session of use, the instructions or procedures of the chip and/or of the interface are used to select or write the characteristics of an instruction different from those of the limited sets or procedures, and an automatic process for the carrying out, during this session of use, of this different instruction after its characteristics have been selected or written in this reserved memory zone.

BRIEF DESCRIPTION OF THE DRAWINGS

The invention will be understood more clearly from the following description and from the figures that accompany it. These figures are given purely by way of an indication and in no way restrict the scope of the invention. Of these figures:

FIG. 1 shows a general view of a communications system according to the invention;

FIG. 2 shows a schematic view of the operation of the automatic process for carrying out the instruction of the complementary set;

FIG. 3 shows typical microprograms implemented in a chip card working with the communications system of the invention.

MORE DETAILED DESCRIPTION

FIG. 1 shows a communications system according to the invention comprising an electronic service center 1, an electronic chip 2 that is borne, for example, by a chip carrier 3 such as a chip card or a chip-based token or any other carrier, notably an integrated circuit connection carrier in its DIP (Dual In-line Package) or SMC (Surface Mounted Component) pack. This system also has a communications interface 4 between this electronic service center 1, this chip 2 and possibly a user who may manipulate control buttons 5 of the interface 4. The electronic service center is the system that houses the application and makes it available to numerous interfaces and users. The electronic service center 1 sends information elements to the interfaces as well as to the card by means of a transmission link 6. There may, however, be a direct connection. The transmission link 6 may also be a path in a data transmission network and may take many forms: it may be a wire link, a RF link etc. It uses a transmission protocol and notably modems 7 and 8 to convey information elements. These information elements represent data elements, addresses and/or instructions.

The interface 4 may be dedicated to an application, for example of the EFTPOS (Electronic Found Transfer Point Of Sale) type or it may be a standard interface, for example of the type used with personal computers or with the Minitel system. The role of the interface essentially is to enable a user to enter into dialog with the electronic service center 1 or the chip 2 and/or to convey and shape information elements sent to the electronic service center 1, the chip 2 or the interface 4. The chip card 3 has data elements proper to the application and proper to the bearer (i.e. the user). It has an operating system that offers a full range of functions by means of a set of instructions which are mostly specific instructions.

In the interface 4, there is installed a microprocessor 9 connected, by means of a control, data and address bus 10, essentially to a program memory 11, a chip-carrier reader 12 and an input/output circuit going towards the electronic service center 1, for example the modem 8. In this minimal version, the interface 4 is used only to ensure traffic with the chip card 3. If need be, the bus 10 is also connected to a display screen 13 used to display the operations carried out. Preferably, the bus 10 is also connected to control buttons 5 enabling action by a user. In this case, the interface is an interface between the operator and the chip card or among the electronic service center, the operator and the chip card. The program memory 11 has a limited set of instructions, in this case the instructions SELECT, READ, UPDATE, STATUS, which are few in number. In practice, the only essential instructions are the instructions SELECT and UPDATE which respectively enable the selection of a memory zone of the memory of the chip card and/or the writing of information therein. However, for reasons of comfort, this limited set will also include solely a read-only instruction READ for the reading of a zone of the chip card and, preferably but not necessarily, an instruction STATUS that can be used to send information on the status of the counters or internal registers of the chip cards to the electronic service center and/or to display them on the screen 13. The content of this instruction is still to be defined. It could also be a Joker type of instruction.

The chip 2 of the card 3 has a microprocessor 14 and a program memory 15 comprising at least one limited set of instructions 16. The set 16 corresponds to the set 11 and contains the same instructions as this set 11, i.e. the instructions SELECT, READ, UPDATE and STATUS. Here too, it is only the instructions SELECT and UPDATE that are essential to the implementation of the invention. It will be noted that the limited sets 11 and 16 may be a little more extensive than these minimum sets. The chip 2 also has a bus 17, which is of the same type as the bus 10, linking up the microprocessor 14, the program memory 15 and an input/output device 18. In the case of the chip cards, this input/output device has a standardized connector whose metallic regions are designed to come into contact with the feelers 19 of the reader 12.

One of the essential characteristics of the invention is that the chip 2 has a reserved memory zone 20 linked by the bus 17 to the microprocessor 14. In this reserved zone 20, the electronic service center 1 prompts the writing of characteristics of an instruction different from that of the limited sets of instructions 11 and 16. It prompts, for example, a writing of the characteristics of an instruction REPORT (different from STATUS) tending to make the microprocessor send a status report, to the screen 13, on the balance of prepaid units contained in an auxiliary memory 21 of the card. This different complementary instruction may also be an instruction ALGO tending to make the microprocessor 14 carry out a message-enciphering algorithm or an algorithm for authenticating the chip card 3 of the terminal 4. This different instruction may also be an instruction CHANGE for changing the value of the prepaid units in order to obliterate certain units 22 in accordance with the duration of the call. It may also be an instruction INVAL to disable or invalidate the card, or any other instruction whose need will gradually become felt as and when the applications themselves develop.

What is stored in the reserved memory zone 20 is not the characteristics of an instruction different from that of the limited set of instructions, but rather an address relating to the storage of an instruction of a complementary set of instructions in a complementary part 23 of the program memory 15 (or of another memory of the chip 2). This mode is preferred because it is enough to make the electronic service center 1 send only the address, in the complementary part 23 of the program memory 15, of the different instructions that have to be carried out: REPORT, ALGO, CHANGE, INVAL, etc. This is shorter. FIG. 2 shows the operation of the preferred automatic process for the performance of the different instruction after it has been selected or written. In this figure, the same elements are designated by the same references as in FIG. 1. The invention is especially valuable when the pair constituted by the interface 4 and the chip 2 must be made to carry out an instruction that is not already in the limited set of instructions 11 or 16. In the following description, the serial or parallel character of the transmission of the various information elements shall not be taken into account. Indeed, the necessary matching operations are carried, firstly, by the MODEM 8 and, secondly, for the known protocols for the management of chip card memories, by the readers 12.

A message 24 is sent out by the electronic service center 1. It essentially comprises a first part 25 relating to an instruction code, a second part 26 relating to a designated memory zone (the zone to which the instruction pertains) and a part 27 relating to a data element. The part 27 may have a fixed or variable length and, in this case, in a known way, it has, by way of a header in binary mode, a byte indicating the length of the information element transmitted.

In a first example, the instruction will be a SELECT instruction, and the concerned memory zone will be the reserved memory 20 whose address is MEM RES, and the data element will relate to the characteristics of an instruction, for example ALGO. The microprocessor 9 of the interface 4 receives this message 24 and transmits the instruction contained in the zone 25, the address contained in the zone 26 and the data element contained in the zone 27 respectively on its control bus 28, address bus 29 and data bus 30. This transmission is sent to the microprocessor 14, according to known protocols and by means of the reader 12 and the connector 18. The microprocessor 14 then carries out the instruction, SELECT for the message 24 or UPDATE for a message 31, starting with the loading of this instruction into its instruction register 32. The concerned instruction is then carried out by the microprocessor 14 which respectively selects or updates the reserved memory 20. To this end, the selection address MEM RES is transmitted by an address bus 33 of the microprocessor 14. A command resulting from the execution of the SELECT or UPDATE instruction is applied, by means of a control bus 34, to a circuit 35 for the management of the memory 20. The circuit 35 is quite simply a read/write circuit so that it can carry out operations for the reading or writing, in the memory 20 at addresses conveyed by the bus 33, of data elements conveyed by a data bus 36. The data bus 36 transmits the data elements received from the bus 33. In the case of the message 31, the microprocessor 14 makes the circuit 35 carry out a recording, namely an operation of writing, in the memory 20 of the message ALGO received from the electronic service center 1. It is observed here that the fact of writing in the reserved memory is in no way different from that of writing in another part of the memory of the chip 2. This is a common type of command. The automatic process of the invention is designed for the transmission, in the instruction register 32 of the microprocessor 14, of the different instruction whose characteristics have thus been stored in the reserved memory 20.

In practice, in a preferred version, what has been stored in the memory 20 is not the instruction itself but an address of an instruction in the complementary set of instructions 23. Hence, after the recording of the characteristics, of the address, of the designated complementary instruction, ALGO, the content of the memory 20 is used to serve as an address and to designate one of the instructions of the program memory 23. In other words, in the preferred automatic process, the microprocessor 14 reads the memory 20 and transmits the data read to its address bus 33. This address designates a memory zone of the program memory 23. Once this designating has been done, the microprocessor carries out a reading, in the designated memory zone, of the data element that is stored therein. This data element is in fact the different instruction. The microprocessor then transmits it by its control bus 34 to its instruction register 32. The microprogram of the automatic process ends with a performance of the different instruction that has been thus loaded.

The object of this different instruction may be to modify the content of an auxiliary memory 21 of the chip 2. This different instruction may also be transmitted, in the reverse direction, to the microprocessor 9 and may be applied to the interface 4 for display on the screen 13 or another such device. It may also be implemented directly, by means of the microprocessor 14, to modify the content of certain memories or peripherals of the interface 4. However, in view of the preferred choices of protocols, which are respectively series and parallel protocols, for a chip card 3 and an interface 4, it is preferred to delegate the implementation of the different instruction to the microprocessor 9. This instruction is therefore loaded into an instruction register of the microprocessor 9, in the same way as for the microprocessor 14.

FIG. 3 shows a preferred operation of a microprogram pre-recorded in a program memory 16 of a chip card liable to implement the communications system of the invention. At the beginning of this microprogram, the microprocessor 14 is in a state of awaiting the reception of an instruction. Then, it receives an instruction transmitted by the bus 28. First of all, it ascertains that this instruction is a selection instruction during a step 37. If this is the case, it carries out the selection of the memory zone, which is the designated memory 20 or memory 21. If not, during a step 38 the microprocessor carries out a test to find out whether the instruction is a reading instruction READ. If this is so, it prompts the reading of the memory zone whose address is contained in the part 26 of the message. If not, in a step 39 it finds out whether the instruction is an updating instruction and, if this is the case, it updates the concerned memory zone. Finally, there is normally no longer any test to be planned, and the remaining instruction should be a STATUS instruction since, in principle, the only instructions that the microprocessor is liable to wait for are the instructions of the limited set of instructions.

It can be seen that it is possible to provide for a larger limited set of instructions or, if necessary, for a smaller limited set of instructions. Only the SELECT and UPDATE instructions are truly indispensable for the method of the invention. Thus, in a step 40, the microprocessor 14 will ascertain that the instruction received is a request for preparing a STATUS report and, if necessary, it carries out this instruction. It must be noted that the STATUS instruction could be a standardized instruction without, in principle, carrying any designation of a memory zone in the zone 26 of the message.

If, on the contrary, during the tests 37 to 40, the microprocessor 14 has not detected the fact that an awaited instruction has been recognized then, in an operation 41, it delivers an error message (which may be displayed for example on the screen 13, but not necessarily so). During an operation 42 following the execution of each of the instructions SELECT, READ, UPDATE and possibly STATUS, the microprocessor 14 seeks to find out whether the address contained in the part 26 of the message was an address MEM RES of the reserved memory. If this was not the case, the microprocessor 14 assumes that the processing of the message has been completely carried out. It returns to a standby or waiting state. As for the STATUS instruction, the system could be designed so that the microprocessor 14 returns systematically to a state of waiting for instructions, or else provision could be made for carrying out the test 42 if the zone 26 of the message has been written in.

Should the zone 20 of the reserved memory be concerned, the microprocessor 14 loads the address bus 33 with the content of this memory. The address bus 33 then designates one of several addresses of the complementary memory 23. Depending on whether the bus 33 designates the first, second or another address of the memory 23, it is possible, with a cascaded battery of tests 43, 44, to prompt the selection, in the memory 23, of one out of several instructions. The instructions have to be stored in the control register 32 of the microprocessor 14. Preferably, the memory 23 will be a non-volatile type of memory, with memory cells comprising floating-gate transistors, preferably of the electrical erasable programmable (EEPROM) type. In this case, after the microprocessor 14 has been made to carry out the complementary instruction, the erasure of the reserved memory is brought about so that this reserved memory is again blank. The erasure step 45 is thus carried out, in this way, after the complementary instruction has been carried out.

It is possible, however, to carry out a different procedure. It is possible, for example, to design the system so that the updating instruction UPDATE carried out by the microprocessor 14 (and not by the microprocessor 9) itself comprises a microprogram consisting of the preliminary erasure of the reserved memory 20 before the recording of a new designator with a view to the execution of another complementary instruction. This is useful when it is necessary to prompt the counting down of units in the memory zone 21 of the chip card 3. Indeed, in this case, at the first transmission, the electronic service center 1 sends an instruction UPDATE relating to the designating of an instruction for counting down units in the complementary zone 23. Subsequently, all that it needs to do is to select the reserved memory so that the units may be counted down automatically. Indeed, the countdown instruction is already recorded in the memory 20, and it is not necessary to rewrite it. It is enough to select it, read it and go through the step 42. If need be, the instruction STATUS may even be used. The message 31, unlike the message 24, contains data elements of greater importance in the zone 27. These data elements themselves also relate to the reserved memory. They may be stored in different memory zones 46 or 47 of the reserved memory. In this case, a first part of the content of the message at the zone 27 will be stored in a first zone 46 of the memory 20, a second part will be stored in a successive zone 47 and so on in succession. This means that rather than sending all the instructions as and when they arise in order to have them carried out by the microprocessor 14, the electronic service center 1 sends only one message containing a sequence of instructions that must be carried out sequentially.

In this case, for example, the memory 20 will contain, in each zone, a field 48 and a field 49. In the field 48, there will be stored the designators or characteristics of the instructions to be carried out. The field 49 will be, for example, a bit (another system could be used) in which a binary information element will indicate, by the presence of a "one", that the performance of one instruction of the complementary set should be followed by the performance of another instruction of the complementary set. By contrast, the presence of a zero will indicate that there are no longer any other instructions to be carried out subsequently. To this end, the performance of each instruction of the complementary set will include, in the microprogram of FIG. 4, a test 50 during which it will be sought to find out whether the performance of a complementary instruction should be followed by a performance of another complementary instruction which may or may not be a following instruction. The routing of the microprogram should then be immediate.

One variant uses an existing procedure for the management of the card. For example, an existing procedure for the authentication of the card comprises the sending, by the electronic service center, of an enciphered random element to the card, the deciphering of this random element by the card, the encryption of a secret code of the card by a DES type algorithm parametrized by the deciphered random element, and the sending of the encrypted secret code to the reader for verification. In the invention, a given random element, for example 0000XXXX, is reserved, firstly in order to indicate by the 0000 that what is involved is not truly an existing procedure and, secondly, in order to load the data XXXX into the memory 20. The rest of the procedure is carried out as described here above. The advantage of using an existing procedure lies in the fact that the (numerous) existing interfaces are already compatible with this procedure. It is enough to insert the test of the presence of the 0000 into the operating system of the new cards that are manufactured.

I claim:

1. A communications system comprising:

an electronic service center;

a communications interface, said communications interface being coupled to said electronic service center; and a chip card, said chip card being coupled to said communications interface, said chip card comprising an electronic chip, said electronic chip including a microprocessor, a reserved memory zone, said reserved memory zone being coupled to said microprocessor, and a program memory, said program memory being coupled to said reserved memory zone and to said microprocessor, said program memory including an automatic process said automatic process comprising an automatic process instruction, said automatic process instruction having data elements defining the characteristics of a supplementary instruction, and said automatic process defining means for executing said automatic process instruction, wherein said execution of said automatic process instruction includes a writing of said characteristics of said supplementary instruction in said reserved memory zone of said chip card, and a designation of an address of said reserved memory zone, for ascertaining that said automatic process instruction designates an address of said reserved memory zone, and for automatically executing said supplementary instruction after said characteristics of said supplementary instruction have been written in said reserved memory zone, said automatic execution occurring contingent upon said ascertainment of said designation.

2. A system according to claim 1, wherein said automatic process further defines means for ascertaining the identity of said automatic process instruction as a member of an elementary set of automatic process instructions.

3. A system according to claim 1, wherein said address of said reserved memory zone stores a further address of said program memory at which said supplementary instruction is stored.

4. A system according to claim 1, wherein the automatic process further defines means for executing a complementary instruction from a complementary set of instructions whose address is stored in said reserved memory zone.

5. A system according to claim 1, wherein said reserved memory zone of said chip is non-volatile.

6. A system according to claim 1, wherein said reserved memory zone relates to a field for storing a sequential character of supplementary instructions, and wherein said automatic process further defines means for testing a value of said field.

7. A method comprising the steps of:

receiving at a communications interface an automatic process instruction, said automatic process instruction having data elements defining the characteristics of a supplementary instruction;

transmitting said automatic process instruction from said communications interface to a chip card;

processing said automatic process instruction in said chip card, said processing step including the steps of executing said automatic process instruction, said executing step including the steps of writing said characteristics of said supplementary instruction in a reserved memory zone of said chip card, and designating an address of said reserved memory zone, ascertaining that said automatic process instruction designates an address of said reserved memory zone, and automatically executing said supplementary instruction after said characteristics of said supplementary instruction have been written in said reserved memory zone, said automatic execution being contingent upon said ascertainment of said designation.

8. A method according to claim 6, further comprising the step of ascertaining the identify of said automatic process instruction as a member of an elementary set of automatic process instructions.

9. A method according to claim 7, wherein said address of said reserved memory zone stores a further address of said program memory at which said supplementary instruction is stored.

10. A method comprising the steps of:

receiving an instruction at a communications interface;

transmitting said instruction from said communications interface to a chip card;

processing said instruction in said chip card, said processing step including the steps of executing said received instruction, said executing step including the step of writing data elements of said received instruction in a memory zone of said chip card, and ascertaining whether said received instruction is an automatic process instruction, and if said received instruction is an automatic process instruction, then ascertaining whether said automatic process instruction designates an address of a reserved memory zone, and if said automatic process instruction designates an address of said reserved memory zone, then executing a supplementary instruction, said supplementary instruction having characteristics defined by said data elements of said automatic process instruction and being stored in said reserved memory zone.

* * * * *